March 29, 1966     A. R. SANCHEZ     3,242,708
SYSTEM OF REMOTE-CONTROL KEYLESS AUTOMATIC ELECTRIC LOCKS
Filed Nov. 27, 1962     9 Sheets-Sheet 1

INVENTOR
ALFONSO RODRIGUEZ SANCHEZ

BY Stevens, Davis, Miller & Mosher
ATTORNEYS

March 29, 1966  A. R. SANCHEZ  3,242,708
SYSTEM OF REMOTE-CONTROL KEYLESS AUTOMATIC ELECTRIC LOCKS
Filed Nov. 27, 1962  9 Sheets-Sheet 2
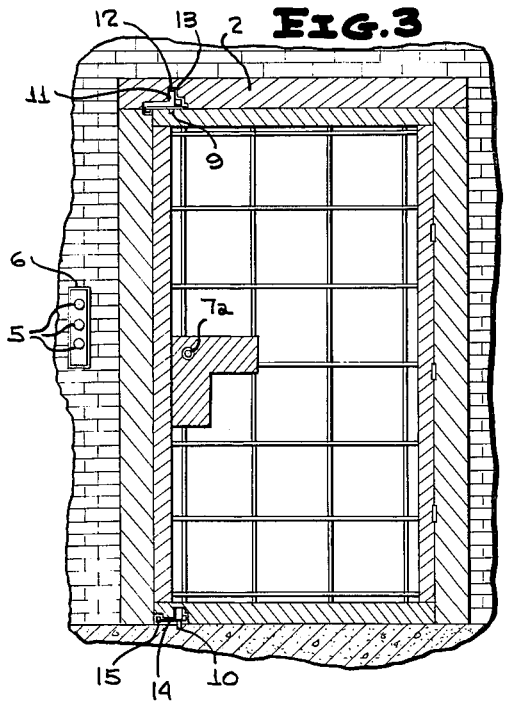
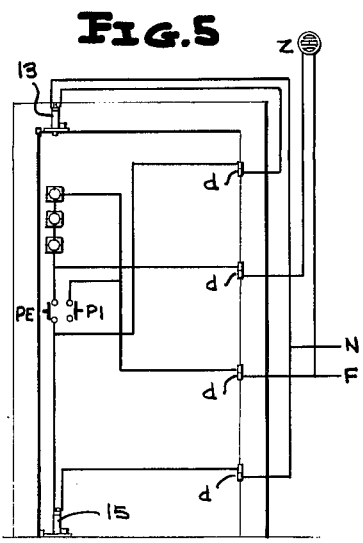
INVENTOR
ALFONSO RODRIGUEZ SANCHEZ
BY Stevens, Davis, Miller & Mosher
ATTORNEYS March 29, 1966 A. R. SANCHEZ 3,242,708
SYSTEM OF REMOTE-CONTROL KEYLESS AUTOMATIC ELECTRIC LOCKS
Filed Nov. 27, 1962 9 Sheets-Sheet 3
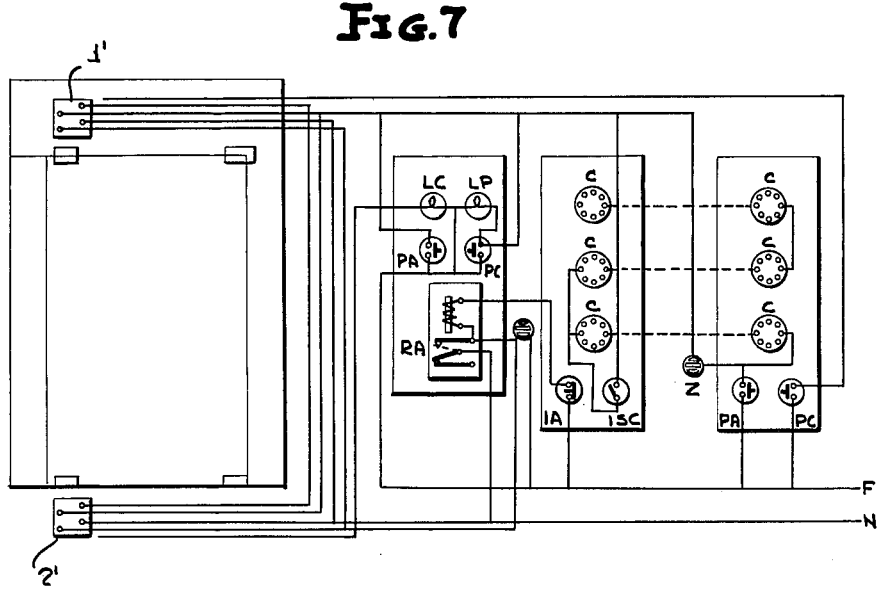
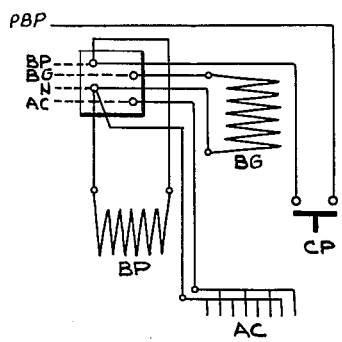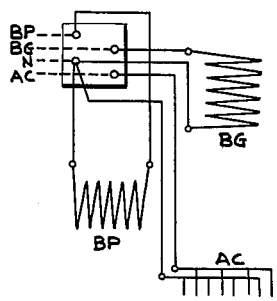
FIG.7-a  FIG.7-b
INVENTOR
ALFONSO RODRIGUEZ SANCHEZ
BY *Stevens, Davis, Miller & Mosher*
ATTORNEYS March 29, 1966       A. R. SANCHEZ       3,242,708
SYSTEM OF REMOTE-CONTROL KEYLESS AUTOMATIC ELECTRIC LOCKS
Filed Nov. 27, 1962       9 Sheets-Sheet 4

INVENTOR
ALFONSO RODRIGUEZ SANCHEZ

By Stevens, Davis, Miller & Mosher
ATTORNEYS

Fig. 8-a
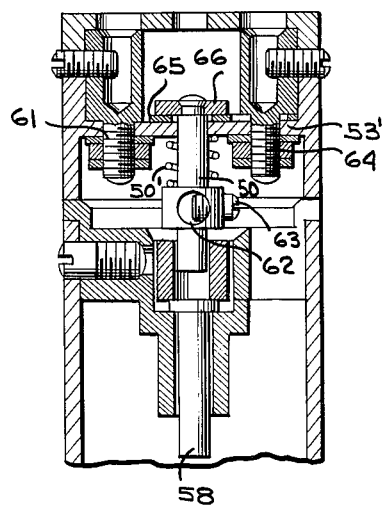
Fig. 8-b
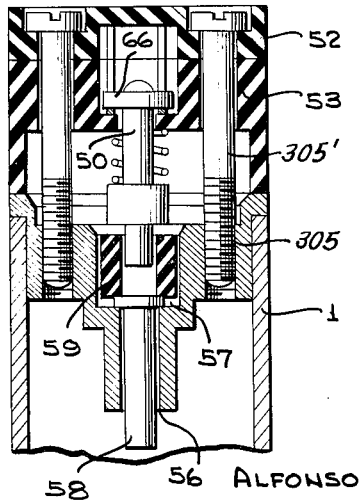

March 29, 1966  A. R. SANCHEZ  3,242,708
SYSTEM OF REMOTE-CONTROL KEYLESS AUTOMATIC ELECTRIC LOCKS
Filed Nov. 27, 1962  9 Sheets-Sheet 6

INVENTOR
ALFONSO RODRIGUEZ SANCHEZ

BY Stevens, Davis, Miller & Mosher
ATTORNEYS

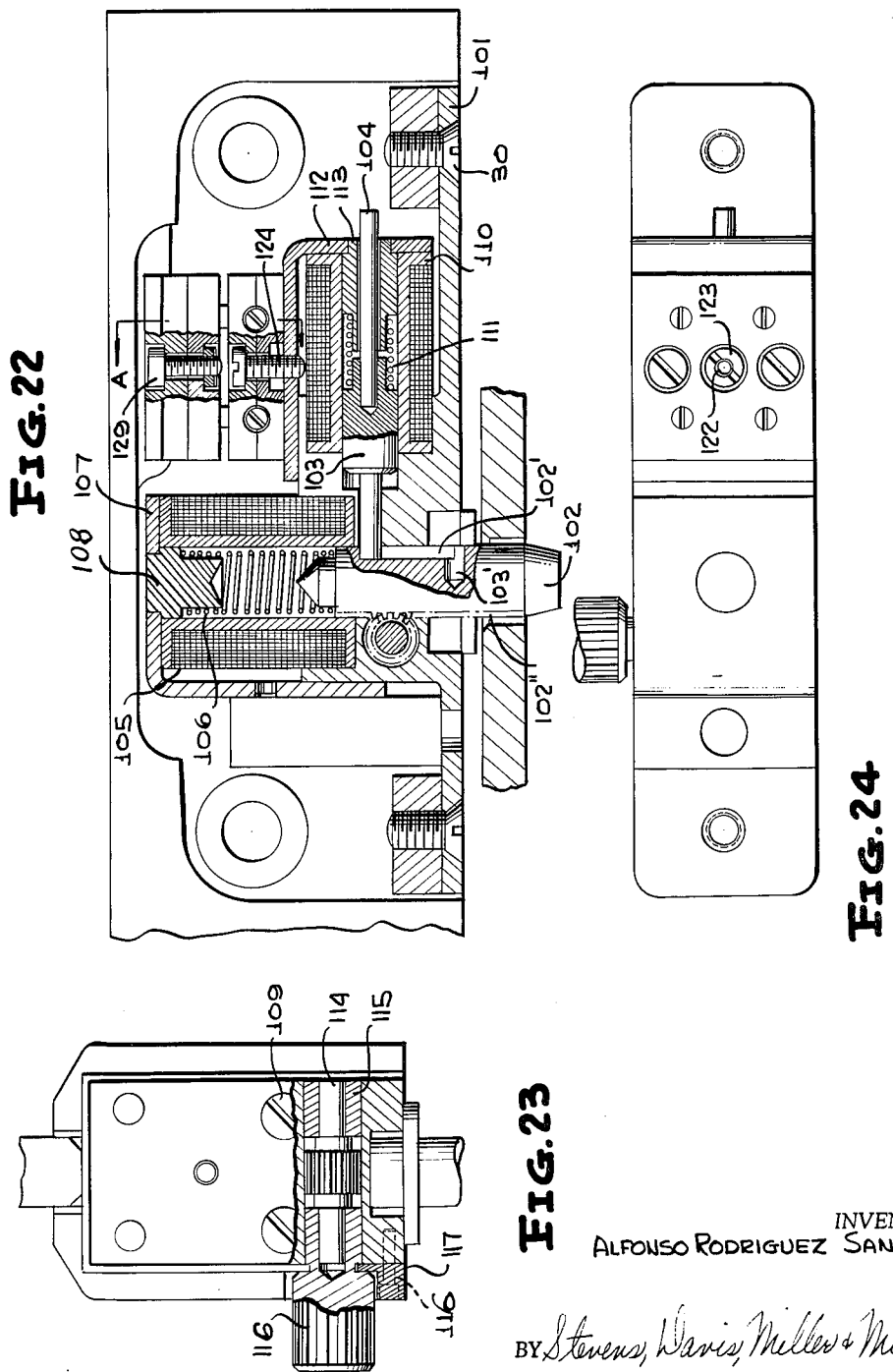

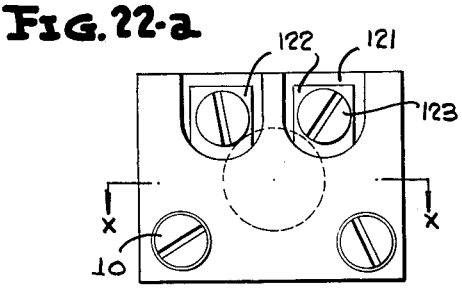
Fig. 22-a
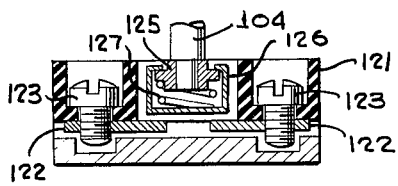
Fig. 22-b
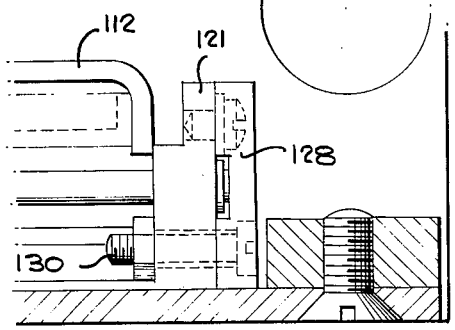
Fig. 22-c
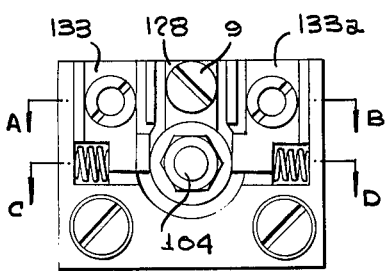
Fig. 22d
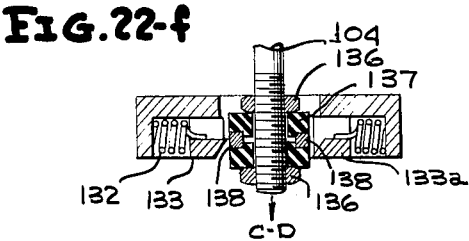
Fig. 22-f
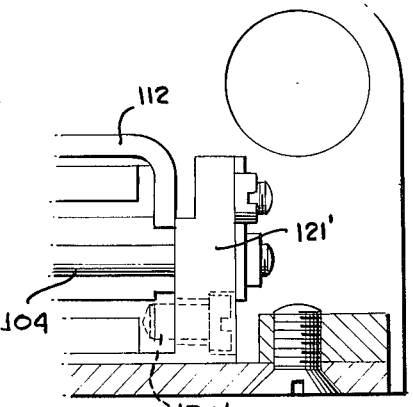
Fig. 22-g
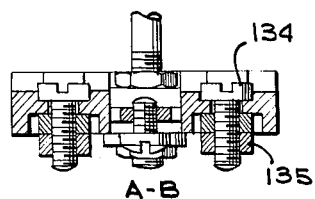
Fig. 22-e
INVENTOR
ALFONSO RODRIGUEZ SANCHEZ
ATTORNEYS March 29, 1966   A. R. SANCHEZ   3,242,708
SYSTEM OF REMOTE-CONTROL KEYLESS AUTOMATIC ELECTRIC LOCKS
Filed Nov. 27, 1962   9 Sheets-Sheet 9
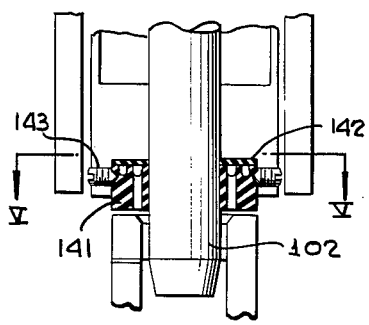
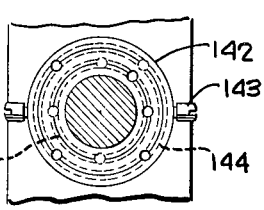
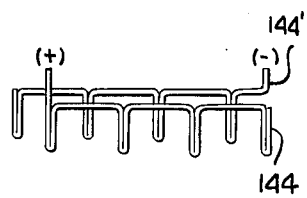
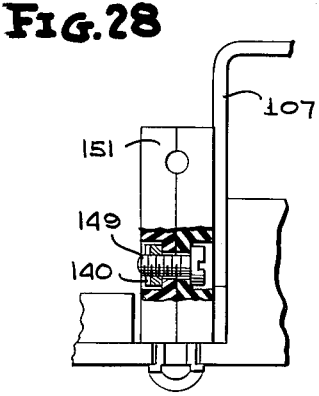
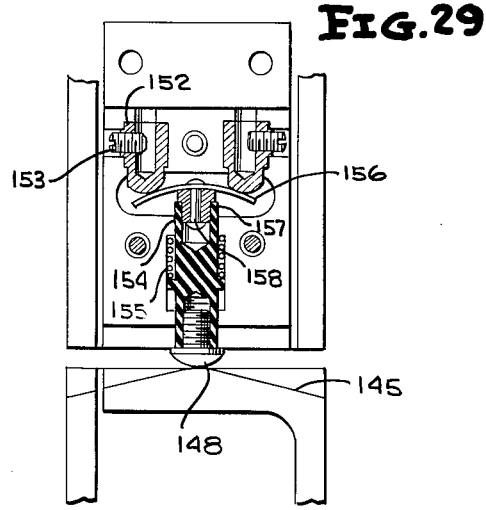
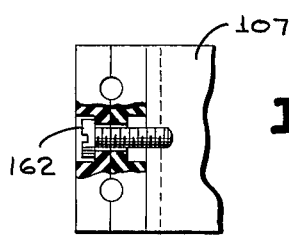
INVENTOR
ALFONSO RODRIGUEZ SANCHEZ
BY Stevens, Davis, Miller & Mosher

United States Patent Office 3,242,708
Patented Mar. 29, 1966

3,242,708
SYSTEM OF REMOTE-CONTROL KEYLESS
AUTOMATIC ELECTRIC LOCKS
Alfonso Rodriguez Sanchez, Madrid, Spain, assignor to Clavex, S.A., Madrid, Spain, a limited-liability company of Spain
Filed Nov. 27, 1962, Ser. No. 240,375
Claims priority, application Spain, Nov. 27, 1961, 272,483
5 Claims. (Cl. 70—277)

The present invention relates to a system of remote-control keyless automatic electric locks.

The systems of electric locks which are now known are based simply on a pushbutton which permits the opening of the lock. There are also other systems which permit the use of a key to close an electric system.

The fundamental basis of the present invention consists in the fact that the locks are entirely separated from each other, that is to say that there can be used as convenient, one or more locks included in the door jamb, in the lintel, and in general any point on the door frame.

In general, the system is preferably based on the use of two locks, one in the upper part and the other in the lower part of the door which permits greater security of the latter, shortening the distances of the lever arm and therefore preventing that it be opened forcefully by a crowbar or similar instrument.

It is also possible to actuate the controllers entirely independently of the lock, which can be used even without controllers, or to provide as many controllers as desired depending on the number of combinations which it is desired to obtain.

The controller is novel, since, various lock systems having been studied, it is noted that in all of them several combinations are necessary. The manufacturer sees to it that the number of combinations is high in order to provide better security for the lock, but there are times when this large number of combinations results solely in an unnecessary expense in their manufacture.

Therefore, in the present system there has been employed another and entirely different arrangement consisting of the fact that it is possible to use the number of combinations desired in each case, that is to say that if a single controller is used on a door, there are eight combinations; if greater security is desired, two controllers are employed, therefore providing 64 combinations, while if even greater security is desired, providing a third controller results in a total of 512 combinations, and so on.

Therefore, this permits great flexibility and in particular, as has already been stated, a high degree of flexibility for each specific case. Another feature of this system which is not present in any other system known heretofore, is the ease of changing the combination. There exist certain electric locks which incorporate more or less complex combination mechanisms. These complex combination mechanisms are established by the factory. This has great drawbacks, since in the event that it is desired to change the combination, it is necessary to get in touch with the manufacturer to have the corresponding changes made.

In the present system, the changing of the combination is so simple that a movement on the controller, which is located on the inside of the room and is known as the master controller, is sufficient for the change in combination to occur. In addition to this, there is, with respect to controllers, the great advantage that they can be completely separated, that is to say that in the same way as the opening controller can be located on the outside, at the place which is most convenient or advisable (maybe on the door, on the frame or on the wall), the master controller can be installed in the most suitable place, whatever the distance from the place where the lock is located.

Another important feature of the controllers is the absence of numbers or letters for the opening of the lock, there being rather employed positions of the controller with respect to the reference points which it bears. The purpose of this is to avoid indiscretions on the part of servants or employees, since the combination and placing of the controllers in position requires a more thorough explanation than the mere indication of a number. Use may be made of colors on the actuator of the controller and on the plate. On the actuator of the master controller, they serve to confuse a curious individual who might have an opportunity to see the master controllers. The colors on the plates serve to assist in recalling the combination more easily, since as an example it makes it possible to combine their colors by forming flags of different countries. There is another great advantage with regard to the controllers, namely that by simple switches it is possible to disconnect one, two or more controllers, which is very useful in offices or places where there is extensive movement on the part of the personnel, since they can enter by knowing the combination of only a single controller. And by actuating a switch, the entire combination can be placed into effect when desired. In such a case, only persons who know the entire combination can place the system in operation.

The many possibilities of actuation which can be used with these simple controllers solve problems of great importance, as in the case of a college dormitory, or the like, in which the possibility of the students entering their room is combined with the necessity of the servants or director being able to enter into the same room.

This case is solved by two controllers for each room, with the master control on the inside and the opening control on the outside. For the servants, it is decided to place an opening controller on the outside. The master controller is common to all the rooms and is located on a control board; this master controller is in its turn controlled by further controllers which the floor leaders can operate. These controllers can also be controlled in their turn by another controller located in the reception room or janitor's room so that the contemplated operation is as follows:

It is not possible for a maid to enter the room if the floor leader has not provided the proper combination for actuating the controller. The floor leader, in turn, cannot provide the proper combination to the maid's controllers if, in the janitor's office or general control room, the controller has not been actuated to provide the proper combination to the floors. The control is as extensive as required by the necessities of operation or the desire of the user.

The two controllers which the resident has in his room are entirely independent of those of the servants. He fixes the combination which he desires on the inside and opens it from the outside, independent of the servants' controller, the latter also being independent of the former. In a room of the resident, there is no master servants' switch, this switch being located in the control room.

For a better understanding of the foregoing, there are attached hereto, by way of illustration and not of limitation, drawings in which:

FIGURE 1 is an elevational view of the outside of a door on which there are mounted the devices corresponding to the present locking system, which may be located on the door, the frame or the wall;

In FIGURE 2, the door of FIGURE 1 is viewed from the inside;

FIGURE 3 shows a section through the door of FIGURE 1;

FIGURES 4 and 5 show the schematic electrical diagram of the parts which compose the electric system for wooden doors of FIGURE 1 in series and in parallel respectively;

FIGURES 6 and 7 show the schematic electrical diagram of the parts which compose the installation for glass doors in series and parallel respectively;

FIGURES 7a and 7b show the wiring diagrams for the upper and lower locks of FIGURE 7;

FIGURES 8a and 8b are vertical sectional views of a disconnecting device which may be used in the present invention;

FIGURE 22 is an elevational view partly in section of the lock object of the invention;

FIGURE 22a is a plan view of an indicating device to indicate the position of the bolt;

FIGURE 22b is a view taken along the lines X—X of FIGURE 22a;

FIGURE 22c shows the device of FIGURE 22a coupled to a part of FIGURE 22;

FIGURE 22d is a plan view of a modification of the indicating device of FIGURES 22a-22c;

FIGURES 22e and 22f are views taken respectively along the lines A—B and C—D of FIGURE 22d;

FIGURE 22g shows the device of FIGURE 22c connected to the vertical part of the support which holds the horizontal stop coil;

FIGURE 23 is a lefthand view partly in cross-section of the lock of FIGURE 22;

FIGURE 24 is a plan view of the lock of FIGURE 22;

FIGURE 25 is a cross-sectional view through the bolt and cutting arm;

FIGURE 26 is a view along lines V—V of the alarm device of FIGURE 25;

FIGURE 27 shows the electrical system in schematic form by which the alarm of FIGURES 25 and 26 is produced when an attempt is made to cut the bolt;

FIGURE 28 shows the position contact device partly in cross-section;

FIGURE 29 is a vertical cross-section of the position contact device of FIGURE 28;

FIGURE 30 is a plan view partly in cross-section showing the device of FIGURE 29 secured to the lock.

Figure 1:
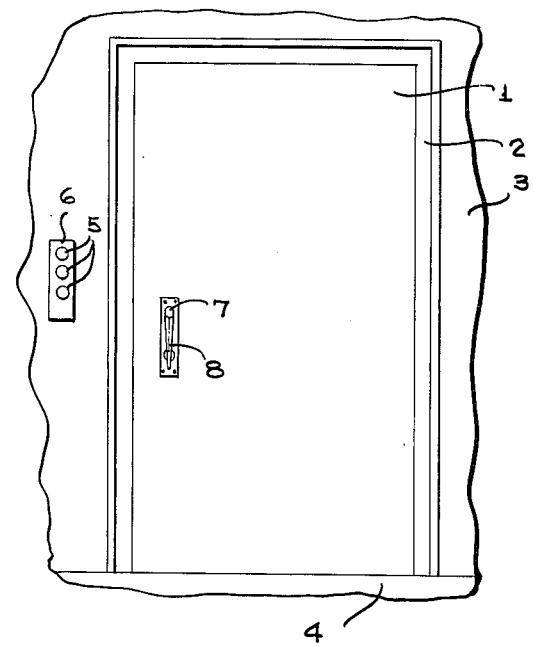

Referring to the figures and to the numbers which designate in them the part and details of the elements shown which are of interest for the purposes of the present specification, they may be described as follows:

The wooden door 1 (FIGURES 1 and 2) mounted in the frame 2 provided in the wall 3 and in the floor 4, is controlled by controllers 5 mounted in the housing 6. The door 1 is opened by the pushbutton 7 mounted on the handle 8 after the combination has been set.

Figure 2:
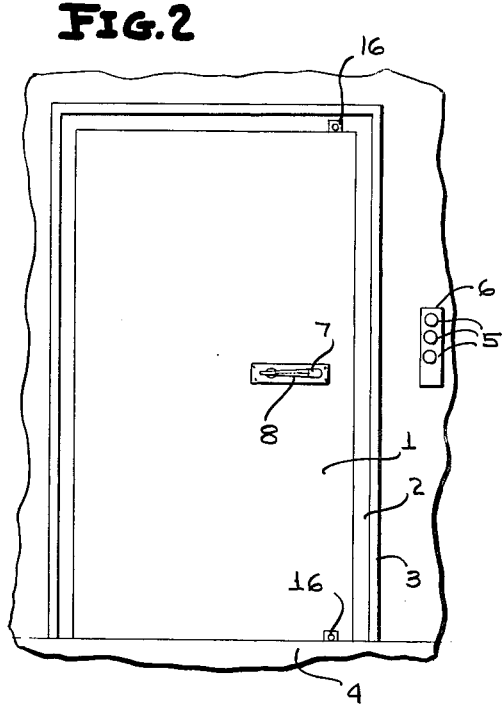

In FIGURE 2 there are shown mechanically actuated controls 16 of the bolts which are preferably disposed in the upper and lower portions of the frame 2 and door 1, respectively.

The locks are installed in the frame 2 (FIGURE 3) and door 1, the bolts of said lock extend into the parts 9 and 10, located in the upper part of the door and in the floor respectively. The lower lock may also be installed in the frame to penetrate into the door instead of the floor, when this is desired. Also when convenient, the lock mechanisms can be installed in doors, the keeper resting then in the frame, or alternatively the lock mechanism in the frame and the keeper in the door; the lock mechanism or keeper can be located, when it goes into the frame, in the lintel, door jamb or doorsill, the keeper or lock mechanism staying then in the corresponding part of the door. The contact 7a is engaged by the pushbutton 7.

The upper bolt 11 has its housing 12 disposed in the frame 2 of the door 1 and is actuated by the coil 13, while the lower bolt 14, is actuated by the coil 15 located in the lower part of the door.

Said coils 13 and 15 (FIGURES 4 and 5) form part of the electric circuit, the wires N and F of which are connected respectively both to the outside through the hinges d of the door in the case of the lower bolt and through the frame of the door in the case of the supper bolt.

Figure 4:
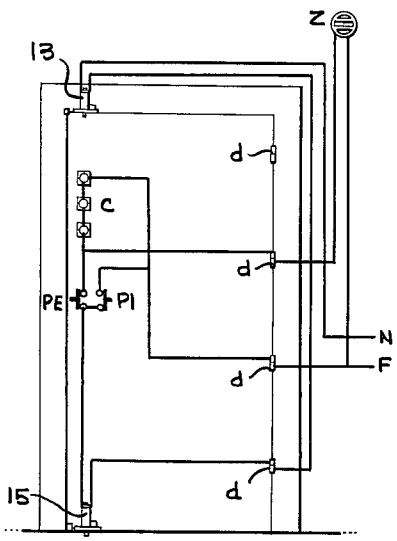

In FIGURES 4 and 5, Z is the alarm buzzer which goes off upon pressing on the outer pushbutton PE when the combination of the system of controllers C is not the opening combination. The pushbutton PI makes it possible to open the bolts without using the controllers.

On the door 1, there are mounted two stationary handles 8, one on the inside and the other on the outside, on each of which there is located a pushbutton 7, which pushbuttons engage contact 7a (FIGURE 3) to actuate the electric device which opens the door; the outside pushbutton opens the door when the combination is correct while the inside pushbutton opens the door regardless of the combination.

On the wall there is arranged a system of controllers 5 on the outside, which correspond to a similar system on the inside. The latter, termed the master controller, makes it possible to change the combination whenever desired. In order to open the door from the inside, it is sufficient to depress the pushbutton 7, without it being necessary to dial any combination.

The electric diagram in the case of a glass door is shown in FIGURES 6 and 7 which refer respectively to a series installation and a parallel installation.

In these figures, the symbols used have the following significance:

F and N=Electrical supply lines.
C=Controllers.
PA=Opening bushbutton.
PC=Closing pushbutton.
LC=Closure lamp.
LP=Position lamp.

RA=Alarm relay.
IA=Alarm switch.
ISC=Upper switch of two combinations.
Z=Buzzer.

The reference numbers 1' and 2' in FIGURES 6 and 7 refer to the connection boxes of the left upper and lower locks which are shown in more detail in FIGURES 7a and 7b. In these figures, the symbols have the following significance:

N=One of electrical supply lines.
BG=Large coil.
BP=Small coil.
PBP=Small coil pushbutton.
CP=Position contact.
AC=Cutting alarm circuit.

These diagrams are given by way of example, as undoubtedly there is an innumerable number of possible connections which can be made and which will beyond any doubt solve the most complicated requirements as to opening and closing of the door.

The operation of the electrical diagram to show the connection of two locks in a glass door, represented in FIG. 6, which is complemented by FIGS. 7a and 7b is according to the following: The control box (at the left in FIG. 6) has within it the following elements: a position lamp LP, a lamp LC which lights as the door closes, a switch button PA for opening the door, a switch PC for closing and a relay RA for maintaining the alarm silent. When the door is in a closed position, the contact position CP (FIG. 7a) remains closed, by which means the position lamp LP is energized; then, if the closing switch PC is pushed, the small coils BP (FIGS. 7a and 7b) are electrically energized, thereby locking the door by means of actuating the locks. At this moment the closure lamp LC is energized thereby indicating that the door is truly shut by the electric locks.

To open the door from the inside, it is necessary only to push the button PA by means of which the large coils BG are energized (FIGS. 7a and 7b).

The relay RA for withholding the alarm bell is operated when someone tries to cut the locks, i.e., when there is a short circuit in the wires of the alarm circuit AC (FIGS. 7a and 7b), thereby energizing the buzzer Z which is connected to it.

On the inside of the door there is a control box shown as the intermediate rectangular box, in which the three main controllers C (see FIGS. 17–20) are housed, together with the alarm interrupter IA and the upper interrupter of the controls ISC. The alarm interrupter IA is really a contact switch which is normally closed and on being operated, shuts off the alarm when this rings constantly by de-energizing relay RA.

In the controllers the key position for the opening of the door will be fixed and are placed in control switches which are housed in the control box and set in the outside portion of the door.

In this same outside control box are situated the opening switch button PA and the closing button PC. The closing button operates the small coils BP (FIGS. 7a and 7b) whatever the position of the outside control switches, and the opening button PA will be able to operate the large coils BG (FIGS. 7a and 7b) only when the said outside control switches are in the key position. If these switches are not in the key position, on operating this button PA for opening the door, the buzzer Z, shown in the diagram on the left of the middle control box, will immediately ring.

If the interrupter switch ISC is closed, this will open the door from the outside by simply setting the control switches in the key position.

The only difference between the electrical diagrams shown in FIGS. 6 and 7 is that in the first of them, the coils of the top and bottom locks, are connected in series whereas in the second, they are connected in parallel.

This implies that the coils which are manufactured for 125 volts, may be used for 220 volts when connected in series.

Figure 8:
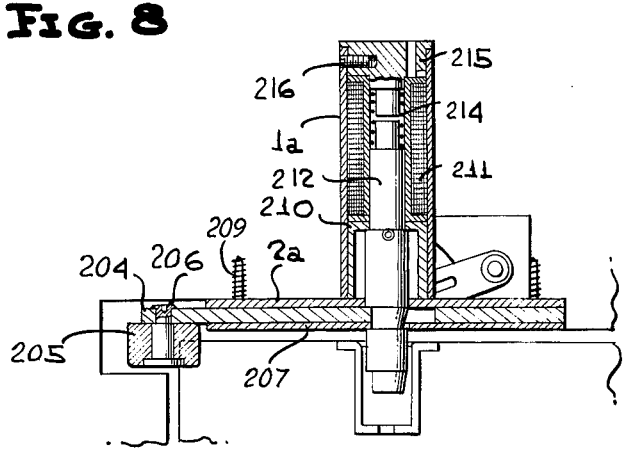
FIGURES 8 and 9 show, in vertical cross-section and in bottom view, the lock in position to be used as an upper lock.
Figure 12:
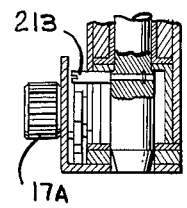
FIGURE 12 is a view along the line A—B of FIGURE 10 showing the details of the mechanical opening controller.
Figure 9:
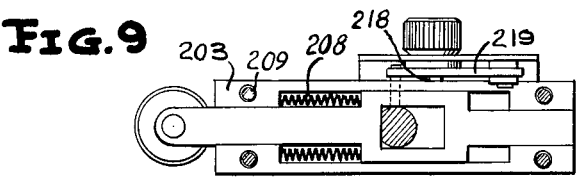
Figure 10:
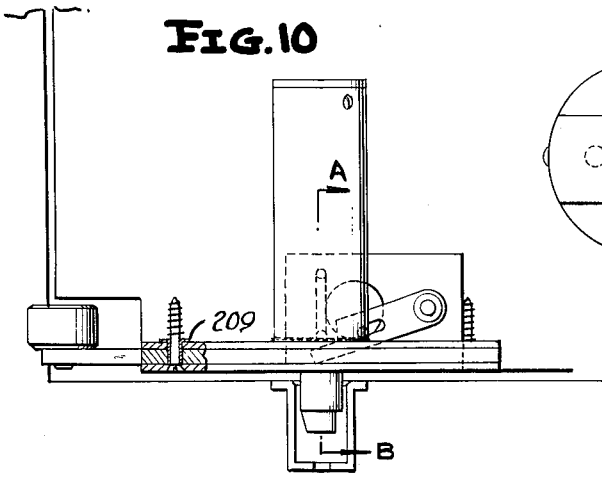
FIGURE 10 shows an elevational view of the lock, with the fastening means for connecting on the lower part of the door.
Figure 11:
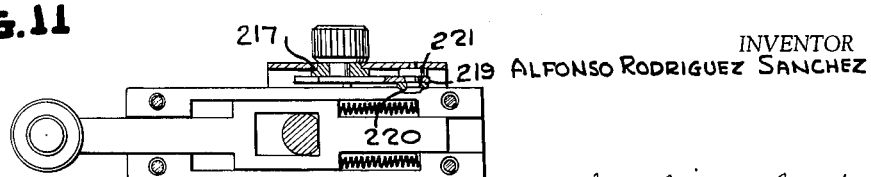
FIGURE 11 shows a plan view of the front lock in which a different arrangement is provided in the mounting.
Figure 17:
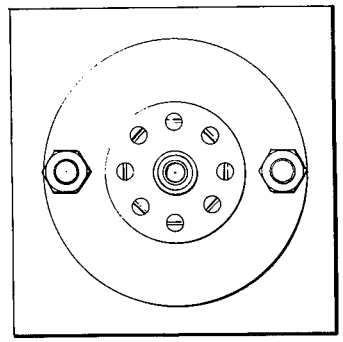
FIGURES 17, 18, 19 and 20 show respectively a rear view, longitudinal sectional view, front view and side view of the controller.
Figure 18:
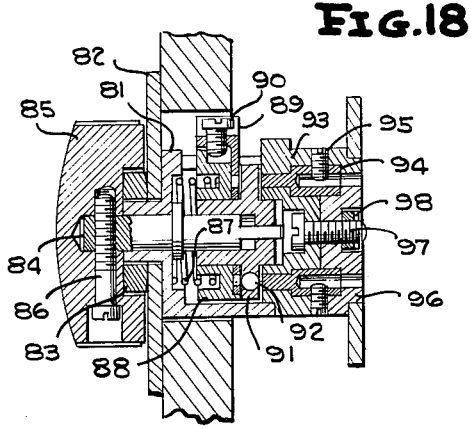
Figure 19:
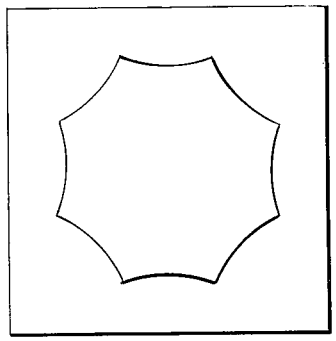
Figure 20:
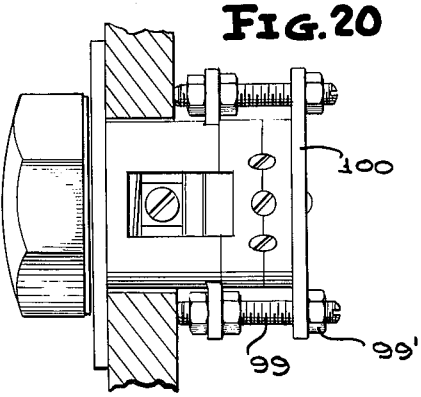

The details of the mounting of the upper bolt for wooden doors, are shown in FIGURES 8 and 9, while FIGURES 10, 11 and 12 show the details of the mounting of the lower bolt 14.

In these figures, the frame formed by 1a and 2a surrounds the coil 211; the spring 214 urges the bolt 212 downward; the additional portion attached to the plate 2a and to the support 207 by the eyelets 209 secures the bolt retention stop 204. By means of springs 208 this bolt retention stop holds the bolt 212 when the door is opened, and frees it when it is closed. On the end of the said stop there is a roller 205 fastened to it by means of the pin 206 so as to actuate stop 204. It is to be understood that other types of stops may be used in addition to those described above.

The mechanical system for raising the bolt is composed of a lift bar 213 screwed to the bolt, on which there acts the lift rod 219 which, in its turn, is moved by the lift bottom 17A through the eccentric washer 217 bearing the protuberance 218 threaded into it. The lift rod 219 is fastened to the support 207, together with the washer 220, by the rod pin 221. Stationary shoulder engaging sleeve 210 supports the coil 211 at its lower part. Sleeve 210 is also an upper stop for movement of the lock. At its upper part, the coil 211 is fastened by an insert 215, fastened to the frame by the set screw 216.

This lock forms a single body by the welding S and is fastened to the door (in the case of the lower lock) or to the frame of the door (in case of the upper lock) by the screws 22.

Figure 13:
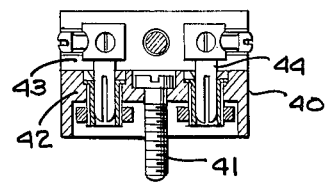
FIGURES 13 and 14 show respectively a vertical cross-section and plan view partly in section to illustrate the sliding of the lock with the elimination of connections.
Figure 14:
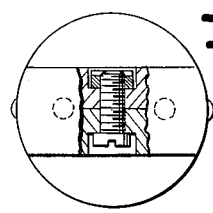

To the upper part of the insert 15, there is fastened the socket 40 (FIGURES 13 and 14) by means of screw 41. This socket receives at its bottom 42 the pins 44 of the support 43 which are connected to the line which feeds the coil of the lock.

In order to avoid the possible overheating of the coil due to continuous pushing either due to improper operation or else due to damage to the pushbutton, there may be used the device shown in FIGURES 8a and 8b, obtaining thereby the result that once the bolt is in its open position, the opening circuit is disconnected even when one still presses on a pushbutton. The disconnecting device of FIGURE 8a can be used in place of that shown in FIGURE 13. The disconnector of FIGURE 8b consists of two parts, the cover 52 and the body 53, which together are connected to the insert 305 by screws 305', both parts being made of insulating material. The insert 305 has at its center a hole 56 and a cylindrical insert 57 in which there are housed a pin 58 and an insulating sleeve 59 connected thereto, respectively. When the core or bolt (not shown) moves up due to the action of the magnetic field of the coil (not shown), it pushes the pin 58 and sleeve 59 and the disconnecting part 50 to move, thereby interrupting the electric circuit which feeds the coil. The conducting wires of the coil are connected as shown by FIGURE 8a in the following manner. One of them is connected directly to the terminal 61 and the other is indirectly connected through the disconnecting part 50 onto contact 62 by the set screw 63. The other conducting wire is connected directly to terminal 64. In this manner, the current which passes through the disconnecting part 50 passes to the terminal 64 through the conductive plate 65 and head 66 of part 50, when the core of the coil does not act on the pin 58. A spring 50' is disposed between section 53' and contact 62 to maintain head 66 into normal contact with plate 65. When the current passes through the coil, the core rises causing the said part 50 to rise, the head 66 of which is moved away from the plate 65 thereby opening the electric circuit between part 50 and terminal 64. The use of this disconnector assures preventing the coil from burning up.

Figure 15:
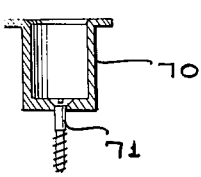
FIGURES 15 and 16 show a vertical elevation and plan view of the keeper.
Figure 16:
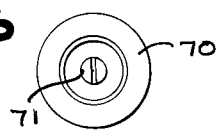

The keeper or receptacle 70 into which the bolt extends when it is in closed position is shown in FIGURES 15 and 16. This part is fastened to the door or floor, depending on whether the lock is the upper or lower lock, by means of the screw 71.

The controller shown in FIGURES 17, 18, 19 and 20 can be mounted on the door, on the frame, or on an independent control away from it. In the case of glass doors, the last mounting is used in order not to impair its transparency but rather add to its appearance. The construction of this controller shows sleeve 81 attached to the fastening plate 82 by nut 83, which is traversed by pin 84, to which the control button 85 is attached by the set screw 86. Spring 87 which rests on the sleeve 81 and acts on the supporting washer 88 to which the end washer 89 is fastened by the screw 90. Ball holder 91 fits the washer 88 and which receives the rotating system imparted to the button 85 by means of the pin 84 which is fastened to it. Conductive ball 92 slides, upon movement of the button 85, on the terminal support 93, making perfect successive contact with terminals 94 disposed in terminal support 93. Terminals 94 have set screws 95 for the retention of the conductive wires and a terminal support cover 96 rigidly connected with the terminal support 93 by the screw 97 and nut 98. Threaded rods 99 and the nuts 99' fastens the sleeve 81 and the flange washer 100, together to hold the elements of the controller together.

The lock mechanism for glass doors is shown in FIGURES 21, 22, 23 and 24, a description of which is now given.

Support 101 on which the closure mechanism unit rests is fastened to the frame of the lock by the screws 30. The closure mechanism unit includes a bolt 102, on which the spring 106 acts to lower it and coil 105 to raise it. A stop 103, on which the spring 111 and the coil 110 act, retains the bolt 102 when the latter is in an open position and prevents the door from being closed as long as the circuit of the coil 110 is not closed and slides it away from the bolt 102. As can be seen stop 103 slides in slot 102' of the bolt and engages hole 103' when bolt 102 is moved to an open position.

A support member 107, for the opening coil 105 is fastened to the support 101 by screws 109 and holds the said coil at its upper part.

An insert 108, on which the spring 106 rests, is fastened to the support member 107.

Similar to the arrangement of the opening system, in the stop system there is a coil support 112 which fastens to the support 101, an insert 113 on which the spring 111 rests and which in its turn is fastened to the coil support 112. This insert is traversed longitudinally by a pin 104 which is connected to the stop 103 in the manner shown in FIGURE 22.

The manual mechanism for the lifting of the bolt, in case of damage or failure of current (FIGURE 23), consists of the following parts which comprise a a lift pinion 114 which receives the turning movement imparted to the knob 116 and which engages with a gear section 102'' on the bolt 102, producing the desired upward movement. For securing the said pinion 114 and the knob 116 within support 101, there are used the sleeve 115 and the detent 117, the latter being fastened by the screw 118.

Figure 21:
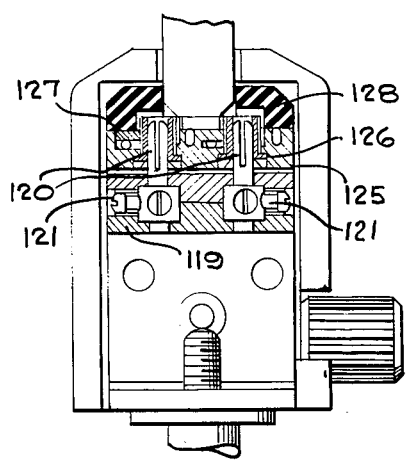
FIGURE 21 shows in elevation and partly in section a lock employed for a glass door.

FIGURE 21 shows the connecting plate 119 with its two pins 120 provided with their set screws 121, FIGURE 22 showing how the said plate 119 is fastened to the support 112 by means of the screw 124. The female connecting plate 125 with the sleeves 126 fastened to it by eccentric nuts 127 is shown in FIGURE 21; on this plate there is located the cover 128 which is attached to it by screws 129, FIGURE 22.

In FIG. 24 a bolt 122 and a grooved nut 123 hold the two parts of connecting plate 119 (FIG. 21) together. The bolt 122 and nut 123 are disposed between screws 124.

FIGURES 22a and 22b are elevational and sectional views of a device indicating the position of the bolt by a pilot bulb, not shown. FIGURE 22c shows the said device coupled to the vertical part of the coil support 112 (FIGURE 22). This device comprises a frame 121 of insulating material on which there are coupled two stationary metal contacts 122 fastened to the frame by screws 123 which in their turn are connected respectively to the supply lines of the electrical circuit. The end of the pin 104, which is moved through the inside of the horizontal coil 110 of FIGURE 22, is coupled to sleeve 125 of insulating material on which there is a conductive cap 126 intended electrically to bridge the contacts 122 when the pin 104 is displaced by the magnetic field created by the coil 110. The spring 127 makes sure that the cap 126 places itself on the contacts 122 in such a manner that the electrical contact made therebetween is perfect. In order to obtain the necessary insulation of the contacts 122, there is provided the insulating cover 128 which together with the support 121 is fastened to the support 112 by the screws 130.

FIGURES 22d–22g show a modification of that of FIGURES 22a–22c.

The pin 104 which extends beyond the coil support 112 passes through an insulating support 121' fastened to it by screws 130'. On support 121' there are mounted two contact members 133 and 133a of conductive material. These contact members near their upper ends are pivotally mounted on screws 134 between support 121' and nuts 135, the latter being mounted on screws 134. The other ends of contact members 133 and 133a are braced against terminal 138 which assures perfect electrical contact. The part of the pin 104 which passes through the support 121' has connected to it by nuts 136, two insulating sleeves 137 between which there is fastened the terminal 138 of conductive material. To the terminal 138 there are connected one of the conductors of the signal pilot lamp (not shown) and the coil input conductor; to the contact member 133, there is connected the coil output conductor while to the contact member 133a there is connected the other conductor of the pilot light. In the open position of the lock (as shown by FIGURE 22f) the terminal 138 and the contact member 133 are in contact, whereby, the coil is ready to be energized. Upon the passage of the current (upon actuation of a remote pushbutton) through the coil, the pin 104 moves in the direction indicated by the arrow, whereupon contact between 133 and 138 ceases thereby disconnecting the coil, whereas the signal circuit to the signal lamp is closed when the terminal 138 and the contact member 133a enter into contact with each other due to the movement of pin 104.

FIGURES 25, 26 and 27 show the alarm cutting device which consists of an insulating washer 141 fastened to the support 101 (FIGURE 22) by the set screws 143 and an insulating washer member 142. Within the washer 141, conductive wires 144, 144' shown in FIGURE 27 are located and each wire is connected to one side of the electrical supply lines. When it is attempted to cut the bolt 102 (FIGURE 22), the insulating washer 141 is first of all cut and the conductors 144 (FIGURE 26) come into contact with each other through the cutting instrument, which contact can be indicated by means of buzzers, bells, etc. (not shown).

The position contact device shown in FIGURES 28, 29 and 30 is a very interesting part of this invention, since it prevents placing the bolts in a closed position without entering into their keeper and at the same time makes it possible to note by means of a pilot light (not shown) when the doors are closed without the bolts being lowered. The device opens and shuts the feed circuit of the coils of the locks and includes two insulating plates 151 held together by the screw 149 and the nut 140. Terminals 152 are connected to the electrical supply lines by their corresponding set screws 153 and a pin 154 slides vertically when the door is closed. A shoe 148 is connected to the pin 154; a spring 155 which, when the door opens holds the pin in the lowermost position. On the upper part of the pin 154, there is fastened an insulating sleeve 157 which carries at its upper part fastened by a rivet 158, a contact 156 such that when the door is closed the shoe 148 rides on abutting portion 145 so that the terminals 152 are short-circuited by contact 156 to energize the pilot light serially connected to the terminals. When the door is opened spring 55 urges pin 154 to its lower position and thus eliminates the electrical contact between the terminal 152 through contact plate 156.

This position contact device can be connected to the support member 107 (FIGURE 22) by the screw 162 when it is desired to use it to record on the board the position of the door by means of a pilot light.

One of the advantages of the present invention is that the locks and controllers (dials) are independent, it being possible therefore to make as many variants as desired. If a high degree of safety or many controls are of interest, this can be easily obtained through addition of more controllers.

Another advantage is that it is not necessary to secure the door with wedges or with any other method in order that it stay open. A hole in the floor is sufficient and merely touching the roller 205 with the tip of the foot is sufficient for the bolt to descend and to be held fast by engaging the hole, without the necessity of bending down.

At the time of releasing the door, it is sufficient to push the handle or pushbutton 7 and the door is entirely free.

In case of failure of current in a new building, the locks can be fed by an auxiliary circuit consisting of a battery since the windings of the coils can be adapted to any voltage.

Another advantage consists in the fact that if a mechanic installs a lock, just after it has been installed, the owner of the lock sets the combination desired and no one, not even the person who has mounted it himself, can enter. Greater guarantee of safety cannot be found since, as the lock does not have any keyhole, it cannot be picked by lockpickers.

The controllers are designed in such a manner that they turn to the right as well as to the left without distinction, they all being identical, so that there is no possibility of finding out the combination and, therefore, of opening it by feel or by ear, as is heretofore possible in similar mechanical combination locks.

In locks for glass doors, the fact that they are permanently open and that the door which supports them is in closed position, makes it necessary to control said door remotely in order to be able to lock it from a control point without being forced to look at it or go to it.

For this purpose, on the control boards of this type of lock, there are green pilot lights which advise one when the door is in position to be locked and a red pilot light which indicates when the door is actually locked by the bolt.

What is claimed is:

1. A locking apparatus for securing a closure member in a frame comprising at least one lock means disposed in one of said closure member and frame, a keeper means mounted in one of said closure member and frame opposite said lock means into which a bolt means thereof engages upon actuation of said lock means, controller means operatively connected between said lock means and an electrical supply means to be selectably set at a predetermined position so as to prepare a circuit to said lock means, and switch means disposed in said electrical supply means to complete said circuit to actuate said lock means to unlock said closure member by removing said bolt means from said keeper means, said lock means including coil means to actuate said bolt means operatively connected to said controller means and electrical supply means, and means engaged by said bolt means when actuated to disconnect said coil means from said electrical supply means in order to prevent said coil means from overheating.

2. A locking apparatus according to claim 1 in which a secondary coil means is disposed in said lock means and operatively connected to said electrical supply means, stop means engaging said bolt means and being actuated by said secondary coil means to maintain said bolt means in an unlocked position when said bolt means is moved to said unlocked position.

3. A locking apparatus according to claim 2 in which means are disposed on said lock means adjacent said secondary coil means to be actuated by said stop means when same is actuated by said secondary coil means to indicate the position of said lock means.

4. A locking apparatus for securing a closure member in a frame comprising at least one lock means disposed in one of said closure member and frame, a keeper means mounted in one of said closure member and frame opposite said lock means into which a bolt means thereof engages upon actuation of said lock means, controller means operatively connected between said lock means and an electrical supply means to be selectably set at a predetermined position so as to prepare a circuit to said lock means, switch means disposed in said electrical supply means to complete said circuit to actuate said lock means to unlock said closure member by removing said bolt means from said keeper means, and an alarm cutting means disposed between said bolt means and keeper means and operatively connected to said electrical supply means which, upon being cut by an instrument, forces the bolt means to energize alarm means operatively connected to said electrical supply means and said alarm cutting means.

5. A locking apparatus for securing a closure member in a frame comprising at least one lock means disposed in one of said closure member and frame, a keeper means mounted in one of said closure member and frame opposite said lock means into which a bolt means thereof engages upon actuation of said lock means, controller means operatively connected between said lock means and an electrical supply means to be selectably set at a predetermined position so as to prepare a circuit to said lock means, and switch means disposed in said electrical supply means to complete said circuit to actuate said lock means to unlock said closure member by removing said bolt means from said keeper means, said keeper means including a retaining means having a biased means engaging a recess in said lock means to retain said closure member in a closed position when said lock means is unlocked.

References Cited by the Examiner

UNITED STATES PATENTS

| 608,319 | 8/1898 | Carleton | 70—282 |
| 1,145,206 | 7/1915 | Moore et al. | 70—432 X |
| 1,165,542 | 12/1915 | Schnerre | 70—282 |
| 1,736,761 | 11/1929 | Haffner | 70—282 |
| 1,768,021 | 6/1930 | Bauerband | 70—282 |
| 1,992,541 | 2/1935 | Peterson. | |

FOREIGN PATENTS

| 1,245,038 | 9/1960 | France. |
| 924,761 | 5/1963 | Great Britain. |

PATRICK A. CLIFFORD, *Primary Examiner.*

ALBERT H. KAMPE, *Examiner.*

B. R. GAY, *Assistant Examiner.*